Feb. 18, 1941. B. GLISAN 2,232,025
OIL FILTER
Filed June 23, 1939 2 Sheets-Sheet 1
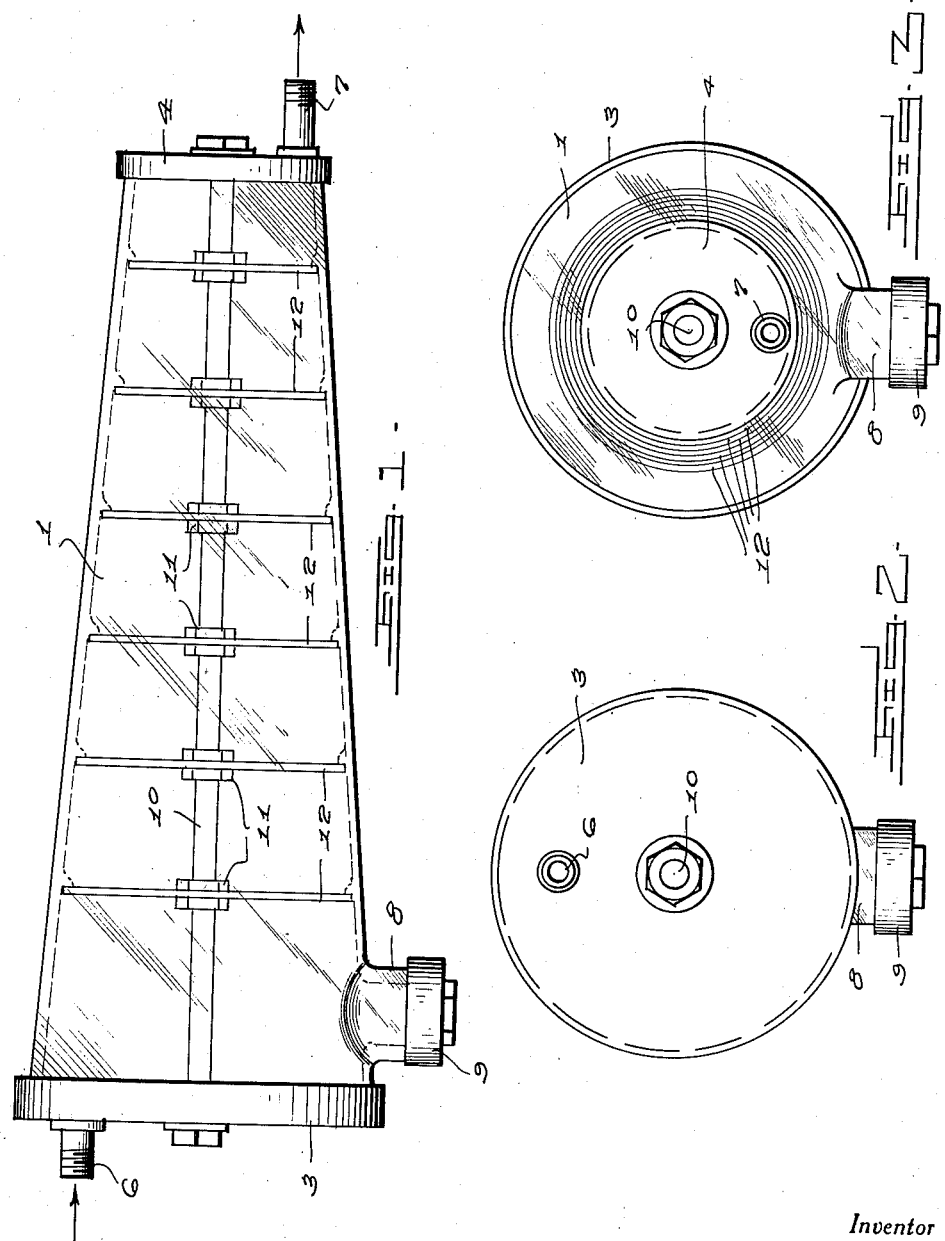
Inventor
BURREL GLISAN,
By Clarence A. O'Brien
and Hyman Berman
Attorneys

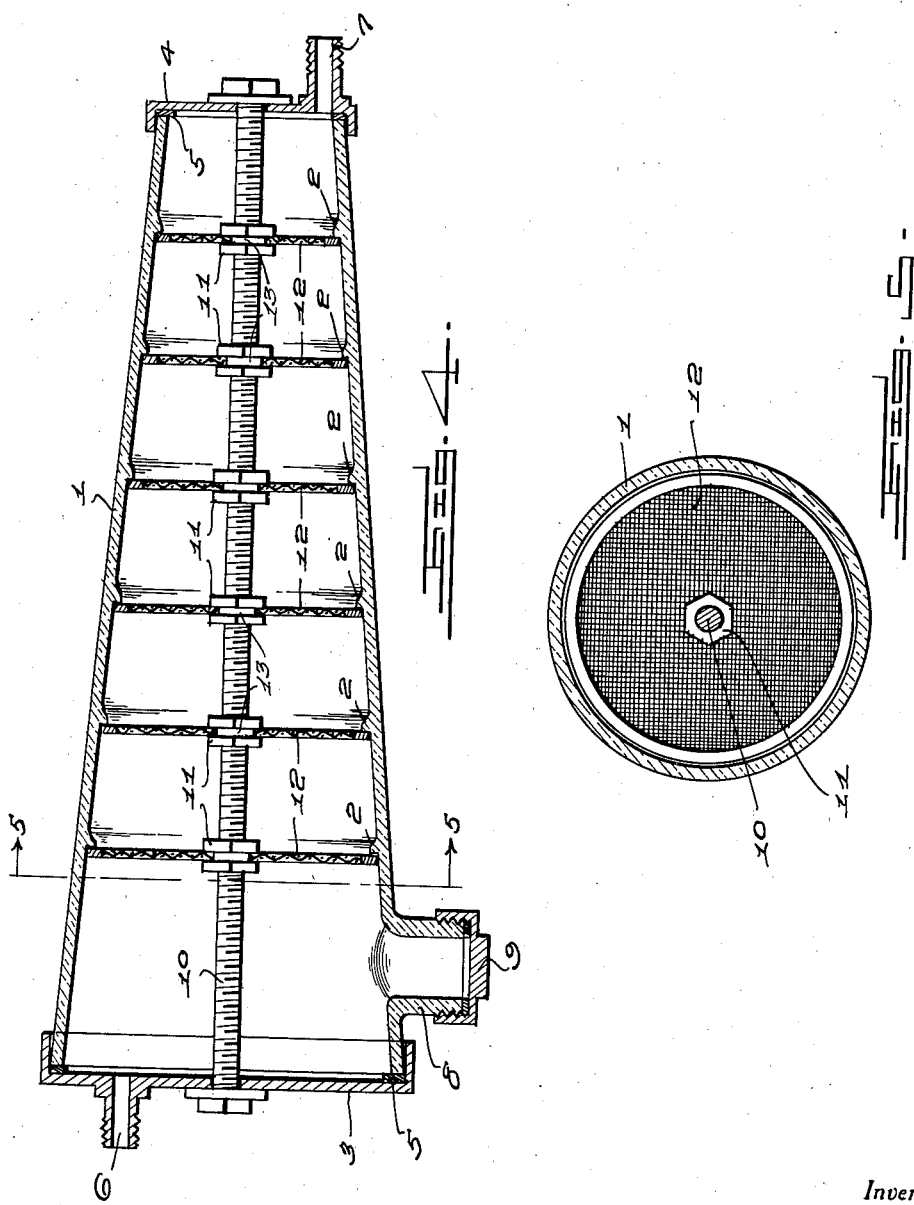

Patented Feb. 18, 1941

2,232,025

UNITED STATES PATENT OFFICE 2,232,025

OIL FILTER

Burrel Glisan, Stronghurst, Ill.

Application June 23, 1939, Serial No. 280,867

1 Claim. (Cl. 210—165)

The present invention relates to new and useful improvements in oil filters particularly for automobile engines and has for one of its important objects to provide, in a manner as hereinafter set forth, a device of this character comprising a novel construction and arrangement of tapered barrel and screens whereby substantially all foreign matter and impurities will be removed from the oil upon a single passage of said oil through the device.

Another very important object of the invention is to provide an oil filter of the aforementioned character embodying a unique construction whereby the device may be expeditiously disassembled when desired for cleaning or for any other purpose.

Other objects of the invention are to provide an oil filter of the character described which will be comparatively simple in construction, strong, durable, highly efficient and reliable in use, compact and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 1 is a view in side elevation of an oil filter constructed in accordance with the present invention.

Figure 2 is an elevational view, looking at the front end of the device.

Figure 3 is an elevational view, looking at the rear end of the device.

Figure 4 is a view in vertical longitudinal section through the filter.

Figure 5 is a cross sectional view, taken substantially on the line 5—5 of Fig. 4.

Referring now to the drawings in detail, it will be seen that the embodiment of the invention which has been illustrated comprises an elongated, tapered barrel 1 of circular cross section, said barrel being of suitable transparent material, preferably "Pyrex" glass. Formed at longitudinally spaced points in the barrel 1 are annular shoulders 2. The barrel 1 is open at its ends and mounted thereon are removable caps 3 and 4. Sealing gaskets 5 are provided between the caps 3 and 4 and the ends of the barrel 1.

The upper portion of the large cap 3 is provided with an intake connection 6. The lower portion of the small cap 4 is provided with an outlet connection 7. It may be well to here state that the device is adapted for connection with the pressure lubricating system of the engine. Any suitable means may be provided for mounting the device on or adjacent to the engine. Depending from the barrel 1 adjacent the intake end thereof is a trap 8. Threaded on the bottom of the trap 8 is a removable cap 9.

The caps 3 and 4 are removably secured on the ends of the barrel 1 through the medium of an elongated bolt or rod 10 which, as illustrated to advantage in Fig. 4 of the drawings, is threaded from end to end. Threadedly mounted on the bolt 10 is a plurality of nuts 11. Mounted on the nuts 11 are screen discs 12 which are adapted to abut the shoulders 2. This is also shown to advantage in Fig. 4 of the drawings. The nuts 11 are provided with peripheral grooves 13 in which the screens 12 are secured.

It is thought that the operation of the device will be readily apparent from a consideration of the foregoing. Oil from the engine enters the tapered barrel 1 at the inlet connection 6. This oil flows through the screens 12 to the small end of the barrel 1 and returns to the engine through the outlet connection 7. In passing through the series of spaced screens 12 substantially all foreign matter is removed from the oil. The screens 12 are of progressively smaller mesh from the first, or largest to the last, or smallest, thereof. The trap 8 is adapted to receive water, etc., that is separated from the oil. Of course, the trap 8 may be conveniently emptied by simply removing the cap 9. By adjusting the nuts 11 on the bolt 10 the screens 12 may be brought to bear against the shoulders 2 in a manner to prevent the passage of the oil between the peripheries of said screens and the barrel 1. By simply removing the bolt 10 the caps 3 and 4 may be removed from the barrel 1 and all of the screens 12 withdrawn from said barrel. Of course, the screens 12 are inserted in and removed from the barrel 1 at the large end thereof. The construction and arrangement is such that the screens 12 are adapted to pass all of the shoulders 2 with the exception of the particular ones on which they are intended to seat. The barrel 1, being of transparent material, permits the oil to be observed as it passes therethrough. It will be noted that the first screen 12 is spaced a comparatively long distance from the intake end of the barrel 1.

It is believed that the many advantages of an oil filter constructed in accordance with the present invention will be readily understood and although a preferred embodiment is as illustrated and described, it is to be understood that changes in the details of construction and in the combination and arrangement of parts may be resorted to which will fall within the scope of the invention as claimed.

What is claimed is:

An oil filter comprising a tapered barrel, annular shoulders at longitudinally spaced points in said barrel, closure caps on the ends of the barrel, a threaded rod mounted on said caps and extending longitudinally through the barrel, nuts threaded for adjustment on said rod, and screens mounted on the nuts and adapted to seat on the shoulders, said nuts having peripheral grooves therein, the screens being mounted in said grooves.

BURREL GLISAN.